United States Patent [19]
Champeon

[11] 3,797,526
[45] Mar. 19, 1974

[54] CAGE VALVE WITH PILOT AND MECHANICAL OPERATING MEANS

[76] Inventor: Edwin B. Champeon, R.R. Box 126, Port Byron, Ill. 61275

[22] Filed: Aug. 21, 1972

[21] Appl. No.: 282,334

[52] U.S. Cl................ 137/630.14, 251/30, 251/38
[51] Int. Cl............................................ F16k 31/40
[58] Field of Search ........... 251/30, 38; 137/630.13, 137/630.15, 630.14

[56] References Cited
UNITED STATES PATENTS

| | | | |
|---|---|---|---|
| 2,968,464 | 1/1961 | Olson | 251/30 |
| 3,424,427 | 1/1969 | Ruchser | 251/30 |
| 3,405,906 | 10/1968 | Keller | 251/30 |
| 2,990,155 | 6/1961 | Selinder | 251/38 X |
| 3,154,285 | 10/1964 | Houle | 251/30 |

FOREIGN PATENTS OR APPLICATIONS 637,715  5/1950  Great Britain.......................... 251/38

Primary Examiner—Arnold Rosenthal
Attorney, Agent, or Firm—Glenn H. Antrim

[57] ABSTRACT

A valve of the cage type has a pilot control seal connected to a solenoid assembly for operation by usual pilot means for medium and high pressure systems and in addition has a lost-motion connection between the solenoid assembly and a control piston that contains the pilot control seal. After the pilot control seal is operated, the solenoid assembly applies force through the lost-motion connection to move the control piston to an open position to provide positive control when the pressure is too low to operate the valve by pilot means only.

3 Claims, 3 Drawing Figures

PATENTED MAR 19 1974 3,797,526

3,797,526

CAGE VALVE WITH PILOT AND MECHANICAL OPERATING MEANS

BACKGROUND OF THE INVENTION

This invention relates to cage fluid valves, and particularly to valves that are operated through both pilot and mechanical means.

Valves of the type shown in U.S. Pat. No. 3,010,691 issued to A.V.H. Canfield on Nov. 28, 1961, and in U.S. Pat. No. 3,059,892 issued to R.T. Windsor on Oct. 23, 1962 are operated by pilot means, have a partition across a chamber to separate an inlet from an outlet, and have a controlled port through the partition. A pilot orifice of limited capacity extends between the input of the valve and a generally closed end of the piston. A controlled pilot duct of greater capacity extends through the piston and valve seal assembly to the outlet of the valve. While the pilot conduit is closed, fluid through the pilot orifice provides sufficient pressure between the piston and the substantially closed end of the cylinder to close the valve and to maintain it closed. When the pilot orifice is opened, the pressure in the substantially closed end of the valve is decreased to allow the valve to be opened by pressure applied to the opposite end of the piston from the inlet.

SUMMARY OF THE INVENTION

An object of the present invention is to improve the structure of valves of the cage type for adapting them to operate over a wide range of pressure.

Another object is to provide valves that operate over wide pressure for either compressible or incompressible fluids.

These objects are achieved by utilizing a combination of pilot means and direct mechanical means to move the piston in a cage-type valve. Like conventional valves, a pilot conduit extending through the piston has a sealing member controlled by the plunger of a solenoid, but in addition, a mechanical connection between the plunger and the piston permits the piston to be moved from a closed position to an open position even though the pressure at the inlet is very low. This mechanical connection may be termed a lost-motion connection in that it permits sufficient movement of the plunger to open the pilot conduit and thereby to relieve the pressure at the substantially closed end of the cage before the plunger applies force directly through the mechanical connection to move the cylinder for opening its main seal.

DESCRIPTION OF THE PREFERRED EMBODIMENTS

Figure 1:
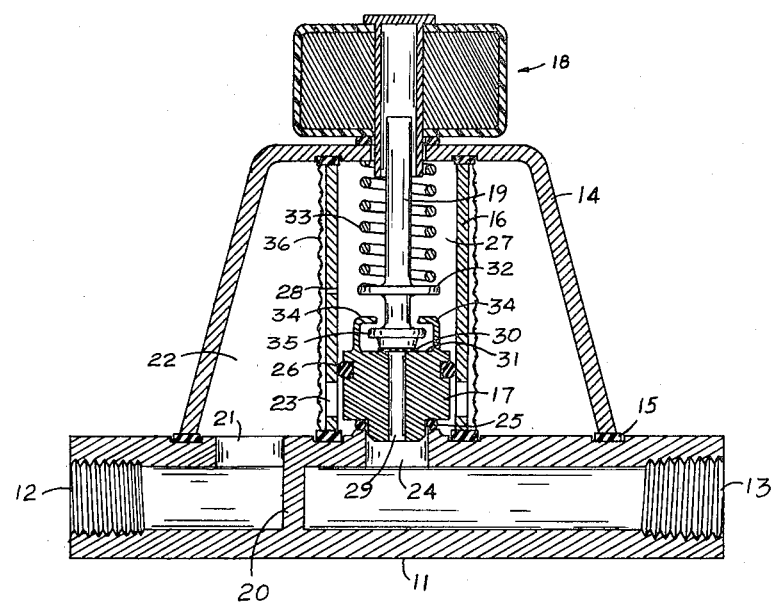
FIG. 1 is a cross-sectional elevational view through the center of the valve according to this invention.

The outward appearance and construction of the valve of FIG. 1 are conventional. A base 11 has an input 12 and an oppositely-directed outlet 13. A housing 14 is mounted on a circular gasket 15 on one side of the base 11. A cylinder or cage 16 is mounted coaxially within the housing 14 between a portion of the base 11 and the opposite inside wall of the housing. Conventional seals or gaskets at each end of the cage 16 prevent leakage of fluid around the ends of the cage. A piston 17 fits loosely within the cage 16, and a solenoid assembly 18 has a control plunger 19 that extends coaxially in the cage 16 to engage the piston 17 for moving it between open and closed positions.

A partition 20 across the base of the valve prevents passage of fluid directly from the inlet 12 to the outlet 13. The conventional passageway for fluid through the valve includes an opening 21 communicating between the inlet 12 and an inlet chamber 22 defined by the wall of the housing 14 and the cylindrical wall of the cage 16, a cage port 23 that usually comprises a plurality of openings through the wall of the cage 16 and spaced a short distance from the base 11, and a main port 24 that communicates between one end of the chamber 27 within the cage 16 and the outlet 13 while the piston 17 is moved to an open position to allow unobstructed flow from the cage port 23 to the main port 24. The cylinder 17 has a circular seal 25 for engaging a sealing surface about the main port 24. As the piston 17 approaches the base 11 while the valve is being closed, the wall of the piston 17 increasingly overlaps the cage port 23 to decrease the flow of fluid through the valve, and the engagement of the seal 25 to its mating surface completely stops all leakage through the valve.

Pilot control of the valve is dependent upon controlling the fluid pressure in the substantially closed end of the cage between the other end of the piston opposite the main seal 25 and the end of the housing 14. The end of the piston facing the closed portion of the cage 16 has an encircling O-ring 26 that fits loosely within the wall of the cage 16 to provide a small or bleeding flow of fluid from the inlet chamber 22 through the cage port 23 past the O-ring 26 to the interior chamber 27 of the cage 16. An orifice 28 may be supplied through the wall of the cage 16 to communicate between the inlet chamber 22 and the interior chamber 27 at a point beyond the path of travel of the piston 17 as it is operated to its open position. If desired, the O-ring 26 may be large enough to stop substantially all flow of fluid, and the amount of the flow can be controlled mainly by the orifice 28. A pilot conduit 29 disposed axially through the piston 17 communicates between the interior chamber 27 of the cage 16 to the outlet 13. The diameter of the pilot conduit 29 is sufficient to permit fluid to flow more readily, while the conduit is open, from the interior chamber 27 to the outlet 13 than the fluid can flow from the inlet chamber 22 through the bleeding passages to the interior chamber 27.

The solenoid 18 controls a seal for the pilot conduit 29 and applies directly mechanical force to the piston 17 for opening the valve when the force against the end of the piston adjacent the main port 24 caused by fluid pressure is less than the frictional forces on the piston. The end of the plunger 19 adjacent the piston 17 has a seal 30 for engaging a sealing surface 31 encircling the adjacent end of the pilot conduit 29. A flange 32 encircling the plunger 19 a short distance from the seal supports a compression helical spring 33 about the plunger 19 between the flange and the housing 14. The spring 33 normally urges the pilot seal 30 against the sealing surface 31, and thereby applies a moderate force to the piston in the direction for closing the main port 24 by the seal 25. The area of the piston within the seal 25 is less than the area of the piston facing the interior chamber 27, and to maintain the valve tightly closed, the force applied to the cylinder resulting from the fluid bleeding from the inlet chamber 22 to the interior chamber 27 and the moderate force of the spring 33 are greater than the opposing force on the surface of the piston 17 enclosed by the seal 25.

Figure 2:
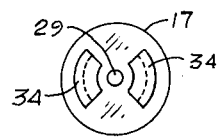
FIG. 2 is a top view of the cylinder of the valve of FIG. 1.

When the solenoid assembly 18 is energized, the pilot seal 30 is moved outwardly from its seal 31 to open the pilot conduit 29 and thereby to equalize the pressure between the outlet 13 and the interior chamber 27. The lost-motion mechanical arrangement between the plunger 19 and the piston 17 comprises a pair of members 34 extending from diametrical portions near the periphery of the surface of the piston 17 that faces the interior chamber 27. The distal ends of the members turn inwardly until they are adjacent, but not touching, the plunger 19. As shown in FIG. 2, the members 34 are preferably arcuate in cross section, and spaced far enough apart to permit the plunger 17 to be moved in a diametral direction to a position between the distal ends of the members 34. A flange or collar 35 encircles the plunger 19 between the longitudinal portions of the members 34, and the length of the members 34 is sufficient to permit the plunger to open the pilot seal 30 before the collar 35 engages the inwardly-turned ends of the members 34 during movement of the plunger 19 in the direction to open the valve. Since the flow through the pilot conduit 29 equalizes the pressure in the chambers at opposite ends of the piston 17, moderate force applied by the solenoid assembly 18 is effective to move the piston 17 away from the port 24 until the wall of the piston clears the cage port 23. To prevent foreign particles or dirt from entering the cage 16, a cylindrical screen 36 extending between the base 11 and the end of the housing 14 encircles the cage to cover the cage port 23.

Figure 3:
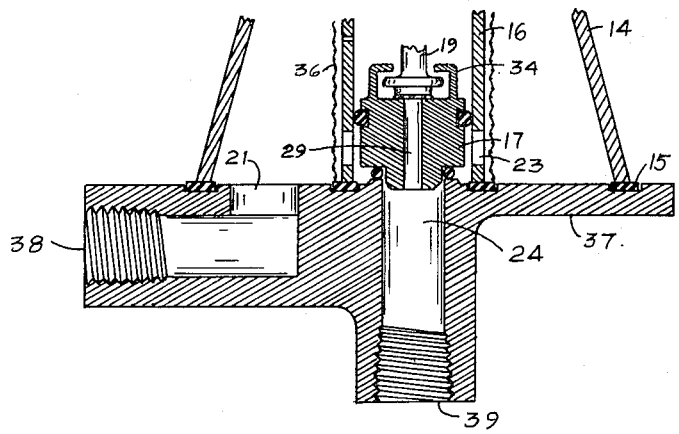
FIG. 3 is a fragmentary, cross-sectional view of a modification of the valve of FIG. 1 to show the inlet and the outlet oriented mutually perpendicularly.

For certain applications, the base of the valve may be changed from the configuration shown for the base 11 of FIG. 1 to that shown for the base 37 of FIG. 3. The inlet 38 and the outlet 39 of the base 37 are mutually perpendicular to provide an angle connection and a direct flow from the port 24 to the outlet 39.

I claim:

1. In a fluid valve of the type having a cylindrical cage, a cylindrical piston disposed within said cage, an outlet, a main port between one end of said cage and said outlet, a main seal attached to one end of said piston and aligned with said main port for engagement thereof, the diameter of said main port being substantially smaller than the diameter of said cage, said piston being a loose, sliding fit for moving longitudinally within said cage between a closed position in said one end of said cage and an open position toward the other end of said cage, said seal engaging said main port in said closed position to close completely said main port, a cage port through the wall of said cage near said one end thereof, the cylindrical wall of said piston being opposite said cage port while said piston is in said one end of said cage, the flow of fluid through said valve being gradually decreased through said cage port to a relatively small amount as said piston is moved from said open position through positions where said cylindrical wall increasingly overlaps said cage port as said cylinder approaches said closed position, a housing surrounding the cylindrical wall of said cage to form an inlet chamber about said cage, and an inlet of said valve communicating with said inlet chamber, a combination of pilot means and direct mechanical means for moving said piston between said closed position and said open position, said pilot means including fluid bleeding means communicating between said inlet chamber and the interior portion of said cage at said other end thereof for all positions of said piston between said closed position and said open position, said interior portion at said other end of said cage being closed except for said bleeding means, a pilot conduit coaxially disposed through said piston, the end of said conduit facing said main port being within the periphery of said main seal and communicating with said main port, a pilot sealing surface encircling the other end of said pilot conduit on that end surface of said piston opposite said main seal thereof, a pilot sealing member, said direct mechanical means comprising a solenoid assembly including a plunger coaxially aligned with said pilot conduit and said pilot sealing member being attached to the end of said plunger adjacent said pilot sealing surface of said piston, a spring connected to said plunger to urge said pilot sealing member against said pilot sealing surface, those portions of said pilot sealing member outside said pilot sealing surface always being surrounded by fluid at the pressure existing within said interior portion of said cage between said piston and said other end of said cage, a lost-motion coupling between said plunger and said piston, said solenoid assembly in response to being energized operable to move said pilot sealing member sufficiently to open said pilot conduit and subsequently operating through said lost-motion coupling for moving said piston from said closed position to said open position, said pilot conduit while open having sufficient capacity to prevent within said interior portion of said cage pressure resulting from continuous flow of fluid through said bleeding means, said spring immediately upon deenergization of said solenoid assembly moving said pilot sealing member to close said pilot conduit and to urge said piston to said closed position, the movement of said piston toward said closed position being namely controlled by moderate force from said spring and the existing fluid pressures on said piston including the pressure of fluid in that portion of said cage between said piston and said other end resulting from continuous passageway provided by said bleeding means.

2. A fluid control valve as claimed in claim 1 wherein said lost-motion coupling comprises a spacing member extending outwardly longitudinally from the other end of said piston about said plunger, said plunger having a collar adjacent said sealing member, the distal end of said spacing member being turned inwardly to engage said collar at an intermediate point in the travel of said sealing member in the direction to move said piston to said open position.

3. A fluid valve as claimed in claim 1 in which said inlet and said outlet face directions that are mutually perpendicular.

* * * * *